May 12, 1953  A. MATHISEN  2,638,286
AIRCRAFT CRASH OR IMPACT DETECTING DEVICE
AND ELECTRIC SYSTEM ASSOCIATED THEREWITH
Filed March 13, 1951  2 Sheets-Sheet 2
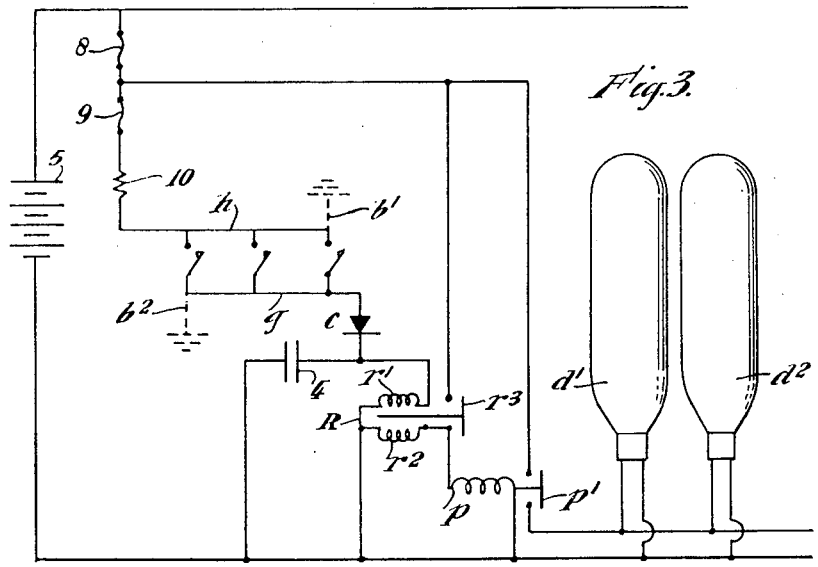
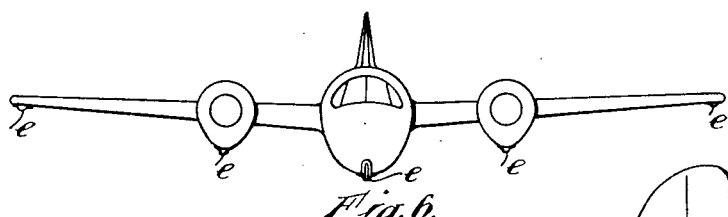
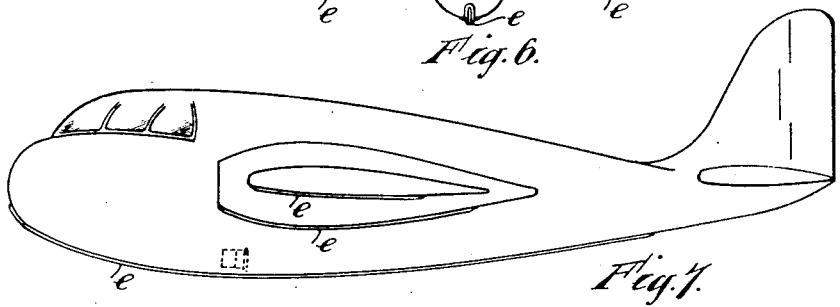
INVENTOR

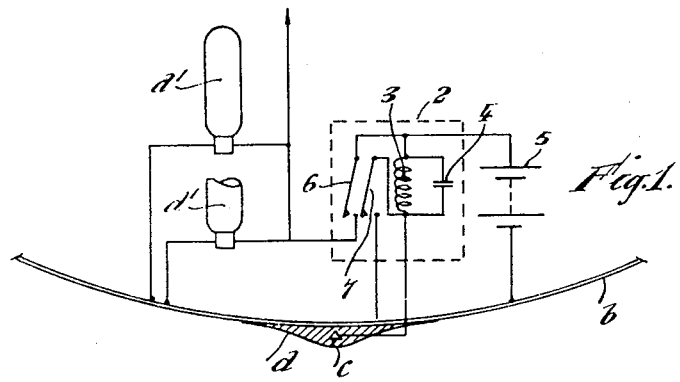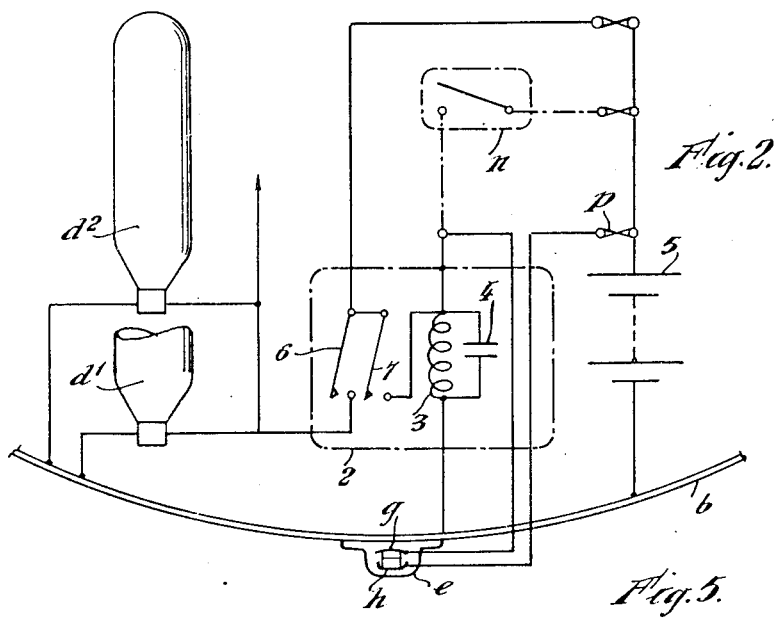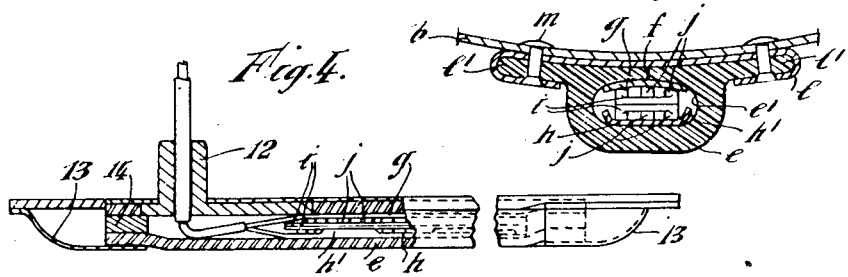

Patented May 12, 1953

2,638,286

UNITED STATES PATENT OFFICE 2,638,286

AIRCRAFT CRASH OR IMPACT DETECTING DEVICE AND ELECTRIC SYSTEM ASSOCIATED THEREWITH

Anders Mathisen, London, England, assignor of one-half to Graviner Manufacturing Company Limited, a British company, and one-half to The Wilkerson Sword Company Limited, a British company, both of London, England Application March 13, 1951, Serial No. 215,346
In Great Britain March 20, 1950

14 Claims. (Cl. 244—1)

This invention relates to improvements in aircraft automatic crash or impact detecting devices and electric systems associated with said devices or switches of the kind described in my U. S. Patent No. 2,551,752.

In said specification unit type switch devices mounted upon or adjacent the skin surface of an aircraft are disclosed, which devices when actuated by impact or contact of the aircraft skin surface with an obstruction actuate fire preventing or like appliances by means of an associated electrical system generally incorporating an electro-magnetic relay or similar device.

In actual practice unit type impact detecting switches fitted within an aircraft or upon the skin thereof have to be provided in large numbers if certainty of operation is to be relied upon in a crash under the varying conditions under which crashes or impacts may take place.

Apparatus made in accordance with the present invention comprises a crash or impact detecting device mounted adjacent the surface skin of the aircraft, electric circuit means including a relay arranged to be energised when the detecting device operates to initiate the operation of fire-preventing or extinguishing equipment, the operation of the relay closing an alternative path for the current energising the relay, wherein a condenser is connected across the energising winding of the relay so as to be charged immediately as said detecting device operates under crash or impact, this static charge being available in an emergency, such as a severance of the electric connection to ensure energising of the relay winding for a time long enough to permit the relay to close its contacts and thus close the alternative path for the relay energising current.

Tests with apparatus comprising electrical contacts connected in an electrical system incorporating a relay provided with a suitable size condenser across the relay coil have shown that a momentary contact of a small fraction of a millisecond is sufficient to charge the condenser and initiate energisation of the relay coil, which energisation is then completed by the subsequent discharge of the condenser through the relay coil. To ensure operation of the fire preventing appliances in case the impact or deformation detecting electric switch device is severed from the aircraft, the relay device according to one feature of the invention is provided with a circuit-closing contact to retain the relay coil energised after initial operation by the condenser.

During said tests it has also been found that in a crash the switch elements may be damaged, distorted or the like and make contact with metal parts of the aircraft and thereby cause a short circuit of the electric supply whereby safety fuses may be blown before the switch devices actuate the relay to energise the fire preventing appliances or like devices upon the aircraft.

According to another feature of the invention electric circuit arrangements are provided for ensuring actuation of the fire preventing appliances and to prevent blowing of the main electric current supply fuse if electrical contact of the switch parts are made with the aircraft structure or other electric conducting parts in a crash or impact.

To this end the above described relay is replaced, according to this feature of the invention, by a double-wound relay, one coil with a condenser in parallel being connected between one terminal of the current supply source and one part of the switch device, the other coil being connected to the same supply source, over a normally open relay contact to the other supply source terminal and to the other switch part.

If the switch parts are forced into momentary contact during a crash or impact the relay and condenser combination will energise the relay over one coil. The relay contact in this case will energise the second coil of the relay to lock this independently of the switch parts as these may be torn off or otherwise damaged. The said contact will also energise a heavy-current contact relay which actually effects operation of the fire preventing appliances.

If at the moment of crash or impact the switch parts are forced into electrical contact with the aircraft structure to which the current supply source is also connected at one pole one or both of two circuit defects may develop.

In one case a short circuit may occur on the relay coil and condenser combination which may result in the condenser discharging to earth and failing to energise the relay coil.

To obviate this a rectifier having high resistance in one direction and low resistance in the opposite direction is connected in the lead from the coil and condenser combination and the switch part not normally connected to the supply source, the arrangement being such that when operating normally the rectifier only reduces the charging or energising current flow slightly, whereas when an earth fault appears discharge of the condenser through the fault is retarded sufficiently to ensure operation of the relay.

Alternatively or simultaneously a short circuit on the current supply source may develop blowing a fuse before the fire preventing appliances are operated.

To obviate this a low resistance and low-current fuse is connected in the leads from the current supply source to one part of the switch device the circuit characteristics being such that the condenser will charge sufficiently to ensure lock-up of the second coil to the other supply source terminal when the switch parts are forced together before the low-current fuse connected to said switch part blows.

The invention also relates to the construction of a crash or impact detecting device for use in aircraft, which, according to the invention, may comprise a resilient casing having two electrical conductor strips mounted therein and electrically separated normally by insulating elements, the arrangement being such that the conductor strips can be brought into contact under the action of pressure exerted from outside the casing.

The device may be made of substantial length so that it can extend in a continuous length over a suitable surface of an aircraft, e. g. underneath the aircraft, fuselage, wing tips, engine and power unit nacelles, and the like.

Further features of the invention will appear from the following description of the invention with reference to the accompanying drawings in which certain forms of the invention are shown by way of example and in which:

Figure 1 shows one type of crash detecting device with its associated electric system;

Figure 2 shows a modified detecting device with a slightly modified associated electric system;

Figure 3 shows the preferred form of electric system;

Figure 4 shows the constructional details of the detecting device shown in Figure 2, in side elevation and partial section;

Figure 5 is a cross sectional view of Figure 4 to an enlarged scale;

Figure 6 is a front elevation of an aircraft showing the position of the crash or impact detecting devices;

Figure 7 is a side view of Figure 6;

Figure 8 is a partial view of an aircraft wing showing one method of mounting the crash detecting device;

Figure 9 is a partial sectional view of an aircraft wing showing another method of mounting the crash detecting device.

Referring now to Figure 1, $a$ denotes a resilient rubber or like electrical insulating material strip secured to the aircraft skin denoted $b$ in any suitable manner such as by adhesive or bonding.

Embedded in strip $a$ is an electric switch contact member $c$ shown in the form of a wedge having its base parallel to skin $b$, the apex being disposed adjacent but slightly spaced from skin $b$ but so arranged that in a crash or impact of strip $a$ with any obstruction the apex will be forced into electrical contact with skin $b$ assumed to be of metal or otherwise made electrically conducting.

The electric system associated with parts $a$, $b$ and $c$ comprises an electric magnetic relay 2 comprising a coil or winding 3 having an electrostatic condenser 4 connected across its terminals, 5 denoting an electric current supply source such as the usual aircraft accumulator. Relay 2 is provided with a normally open contact 6 which closes when the relay is energised by contact between contact member $c$ and skin $b$ in a crash or the like, contact 6 then energising fire extinguishing appliances $d^1$ and $d^2$ and other fire preventing appliances. Contact 7 of relay 2 closes a circuit for winding 3 independent of contact member $c$ in case this should be damaged in a crash.

Tests have shown that when an aircraft fitted with detecting device $a$ and $c$ strikes a sharp obstruction in flight contact member $c$ will momentarily be forced into contact with skin $b$ but severance may take place in a few milliseconds.

Under such conditions relay 2 may fail to operate due to delay in building up the magnetic flux in the relay core by winding 3 and for this reason condenser 4 is provided across winding 3 as this condenser will be charged during the momentary contact and will then discharge through winding 3 to complete energisation and lock-up of the relay over its contact 7, independent of contact member $c$ and skin $b$.

The device and system shown in Figure 1 constitutes an earth or aircraft frame electric return circuit arrangement for contact element $c$, and a preferred arrangement constituting an insulated conductor system is shown in Figure 2, the detecting device in this figure being shown separately in detail in Figures 4 and 5. As shown in these figures the detecting devices comprise an extruded rubber or like electric insulating material section $e$, split at $f$ to permit insertion of electrical contact strips $g$ and $h$ into an oval aperture $e^1$, the strips $g$, $h$ being separated by insulating strips $i$, these being identical and placed back to back with pimpled projections $j$ abutting against conductors $g$ and $h$ to retain the latter in spaced relation until pressure is applied to section $e$, when contact strip $h$ will be forced into contact with strip $g$ by means of contact lugs $h^1$. Section $e$ may be secured in a metal clip device $l$ formed to clamp side lugs $e^1$ and $e^2$ of section $e$, these parts being secured to aircraft skin $b$ by rivets or the like $m$.

Referring now to Figure 2 this system is similar to Figure 1 except that strip $a$ and contact $c$ is replaced by the detector of Figures 4 and 5 and an inertia-operated crash or impact switch $n$ is shown added to the system, corresponding to and serving the same purpose as switch $i$ in my U. S. Patent No. 2,551,752.

Tests have shown that when aircraft skin $b$ strikes an obstruction such as a concrete runway at high speed contact strips $g$ and $h$ may be relied upon to make momentary contact but if contact strip $g$ is forced into contact with skin $b$ then a short circuit may occur on relay winding 3 and condenser 4 or, alternatively, as the contact strips are closed, a fuse $p$ from the main supply source may blow, in which case relay 2 may fail to operate contact 6 to actuate the fire preventing appliances, such as fire extinguishers $d^1$ and $d^2$. To overcome this defect the system shown in Figure 3 is adopted, the contact strips $g$ and $h$ being indicated diagrammatically in this figure. Relay 2 is replaced by relay R which has two windings $r^1$ and $r^2$ and a single contact $r^3$. Condenser 4 connected across winding $r^1$ and the connection between these windings and contact strip $g$ includes a rectifier C having a low resistance in the direction of the arrow and a high resistance in the opposite direction.

The effect of this arrangement is that if, at the moment of crash, contacts $g$ and $h$ close, current will flow from the source 5 to energize winding $r^1$ and charge condenser 4. In the event that a short circuit should occur substantially simultaneously at $b^1$ or $b^2$, the current charge in the condenser will be prevented by rectifier C from being discharged to earth but will be discharged through the winding $r^1$, thus ensuring the closure of contact $r^3$ and energising winding $r^2$ independently of contact strips $g$ and $h$, irrespective of whether or not there is a short circuit. Therefore, relay R is energised, closing contact $r^3$ and closing the circuit of a heavy-current relay P having a contact $p^1$ which operates extinguishers $d^1$ and $d^2$ and other fire preventing appliances.

To prevent blowing of the current supply source fuses a heavy-amperage fuse 8 is provided in the leads to contacts $r^3$ and winding $r^1$, a low-amperage fuse 9 being provided in the lead to contact strip $h$ together with a low value resistance 10 which is connected in series as shown. If a short circuit appears at $b^1$ or $b^2$ resistance 10 will retard the blowing of fuse 9 sufficiently long to ensure charging of condenser 4 and energisation of winding $r^1$, this again ensuring lock up of relay R over its winding $r^2$ and contact $r^3$.

Referring now again to Figures 4 and 5 the detector strip $e$ with its internal switch parts $g$, $h$ and $i$ may be produced in long lengths of sufficient flexibility to be rolled up and unrolled.

The devices are applied longitudinally to the underside of the aircraft fuselage, the engine and power unit nacelles and under surface of the wing tips as shown in Figures 6 and 7.

At one end each detector is provided with insulated electric leads connected to strips $g$ and $h$ as shown in Figure 4, these leads being taken through an insulating grommet device 12 which projects through clip device $l$ and through skin $b$ into the interior of the aircraft when the relay and other electric circuit appliances are mounted on stout aircraft structure members shielded from the effects of the initial impact of the aircraft with any obstruction.

The ends of detector strip $e$ on each portion of the aircraft are fitted with fairing cap portions 13 as shown in Figure 4 these shielding the ends of parts $e$ and $l$ against the slip stream and preventing ingress of moisture and the like by the use of a resilient pad or the like 14 inserted in core $e^1$ and clamped lightly as shown in Figure 4.

The detector device when applied to aircraft as shown in Figures 6 and 7 is only discernible as slight longitudinal beads which offer negligible resistance in flight.

In some cases the detecting strips may be mounted transversely to the direction of flight and in this case in slower types of aircraft the strips may be mounted externally on the leading edge of the aircraft wings as shown in Figure 8, the wing section being shown fitted with an expanding and contracting de-icing device to the fairing strips of which detector $e$ is shown secured.

In the case of high-speed aircraft internal mounting of strip $e$ is desirable as shown in Figure 9 in which a support member 15 is secured by bracket means 16 to a main wing spar member 17.

The disposition of detector strips $e$ as shown in Figures 8 and 9 will ensure operation of the fire preventing appliances in case an aircraft strikes a fence post or other projecting obstruction in which case the longitudinal strips might not be affected by the impact.

The construction of the detector strip enables this to be checked before each flight to make sure that it is operating properly. The check can be effected by applying a fairly hard pressure, for example by using a hammer handle or other suitable implement, to close the contact strips together, to supply current to a signal lamp, the strips returning into the open position under the action of the elastic pimples, when the pressure is removed.

What I claim is:

1. In an aircraft, apparatus for automatically intiating the operation of safety equipment such as fire-preventing or extinguishing equipment for the aircraft in the event of crash or impact, comprising a crash or impact detecting device mounted substantially adjacent to the surface skin of a predetermined vulnerable portion of the aircraft which portion is subject to possible damage or severance during flight by contact with obstructions external to the aircraft, an electrical circuit for connection to the safety equipment and operable in response to the operation of said detecting device to initiate the operation of said equipment, said circuit comprising voltage supply means, relay means disposed within said aircraft at a location remote from said vulnerable portion and having an energizing winding electrically coupled to said detecting device and said voltage supply means for energization thereby when said detecting device is operated, said relay means having contacts adapted, when actuated in response to energization of said relay means, to complete circuit connections from said voltage supply means to the safety equipment to initiate operation thereof, and an auxiliary circuit no part of which passes through said vulnerable portion of the aircraft and connected in parallel with said energizing winding for ensuring energization of said winding for a period of time long enough after operation of said detecting device to permit said contacts to close regardless of whether said device or its electrical connections is severed or disabled after operation of said device, said auxiliary circuit including an electrical energy storage device having a capacitance chargeable to a predetermined electrical charge level substantially instantaneously after the operation of said detecting device to serve as a reservoir of electrical energy for discharge through said winding ensuring continued energization thereof until actuation of said contacts.

2. In an aircraft, apparatus for automatically initiating the operation of safety equipment such as fire-preventing or extinguishing equipment for the aircraft in the event of crash or impact, comprising a crash or impact detecting device mounted substantially adjacent to the surface skin of a predetermined vulnerable portion of the aircraft which portion is subject to possible damage or severance during flight by contact with obstructions external to the aircraft, an electrical circuit for connection to the safety equipment and operable in response to the operation of said detecting device to initiate the operation of said equipment, said circuit comprising voltage supply means, relay means disposed within said aircraft at a location remote from said vulnerable portion and having an energizing winding electrically connected to said detecting device and said voltage supply means for energization thereby when said detecting device is operated, said relay means having contacts adapted, when actuated in response to energization of said relay means, to complete circuit connections from said voltage supply means to the safety equipment to initiate operation thereof, a normally open holding circuit no part of which passes through said vulnerable portion of the aircraft for maintaining a closed electrical path from said supply means to said energizing winding when said holding circuit is closed, said holding circuit including contacts adapted to be actuated by energization of said relay means to close said holding circuit, and an auxiliary circuit no part of which passes through said vulnerable portion of the aircraft, said auxiliary circuit being connected in parallel with said energizing winding and adapted to ensure energization of said winding for a predetermined period of time after operation of said detecting device to permit actuation of the contacts controlled by said relay means regardless of whether said device or its electrical connections becomes severed or disabled after operation of said device, said auxiliary circuit including a condenser chargeable to a predetermined charge level substantially immediately after the operation of said detecting device and dischargeable through said energizing winding to ensure continued energization thereof until actuation of the contacts of said holding circuit.

3. In an aircraft, apparatus for automatically initiating the operation of safety equipment such as fire-preventing or extinguishing equipment for the aircraft in the event of crash or impact, comprising a crash or impact detecting device having two normally open contacts mounted substantially adjacent to the surface skin of a predetermined vulnerable portion of the aircraft which portion is subject to possible damage or severance during flight by contact with obstructions external to the aircraft, an electrical circuit for connection to the safety equipment and operable in response to the operation of said detecting device closing said contacts to initiate the operation of said equipment, said circuit comprising voltage supply means, relay means disposed within said aircraft at a location remote from said vulnerable portion and having an energizing winding electrically connected to said detecting device and said voltage supply means for energization thereby when said detecting device is operated closing said contacts, said relay means having contacts adapted, when actuated in response to energization of said relay means, to complete circuit connections from said voltage supply means to the safety equipment to initiate operation thereof, a normally open holding circuit no part of which passes through said vulnerable portion of the aircraft for maintaining a closed electrical path from said supply means to said energizing winding when said holding circuit is closed, said holding circuit including contacts adapted to be actuated by energization of said relay means to close said holding circuit, an auxiliary circuit no part of which passes through said vulnerable portion of the aircraft, said auxiliary circuit being connected in parallel with said energizing winding and adapted to ensure energization of said winding for a predetermined period of time after operation of said detecting device to permit actuation of the contacts controlled by said relay means regardless of whether said device or its electrical connections becomes severed or disabled after operation of said device, said auxiliary circuit including a condenser chargeable to a predetermined charge level substantially immediately after the operation of said detecting device and dischargeable through said energizing winding to ensure continued energization thereof until actuation of the contacts of said holding circuit, and a rectifying device connected in series with said energizing winding and said condenser to present a relatively low impedance to the current from said supply means initially energizing said winding and charging said condenser and to present a relatively high impedance to the discharge current from said condenser should the contacts of said detecting device become short-circuited to ground.

4. In an aircraft, apparatus for automatically initiating the operation of safety equipment such as fire-preventing or extinguishing equipment for the aircraft in the event of crash or impact, comprising an impact detecting device having contact means and mounted substantially adjacent to the surface skin of a predetermined vulnerable portion of the aircraft likely to be damaged or severed during flight by contact with obstructions external to the aircraft, voltage supply means, an electrical circuit for operatively connecting said safety equipment to said supply means to initiate the operation of said equipment upon closure of said contact means when crash or impact occurs, said circuit comprising a relay disposed within the aircraft at a location remote from said vulnerable portion and having an energizing winding electrically connected in series with said detecting device to said supply means for energization by said supply means when said contact means are closed, said relay having first and second pairs of normally open contacts adapted to be closed when said relay is energized for a predetermined period of time, said first pair of contacts being connected in series with the connections from said supply means to said safety equipment and adapted, when closed, to complete circuit connections from said supply means to said equipment to initiate operation thereof, a normally open holding circuit no part of which passes through said vulnerable portion of the aircraft for maintaining a closed electrical path from said supply means to said energizing winding when said holding circuit is closed, said holding circuit including said second pair of contacts adapted, when closed, to close said holding circuit, and an auxiliary circuit no part of which passes through said vulnerable portion of the aircraft, said auxiliary circuit being connected in parallel with said energizing winding and adapted to ensure energization of said winding for said predetermined period after operation of said detecting device to permit closure of the pairs of contacts of said relay regardless of whether said device or its electrical connections becomes severed or disabled after operation of said device, said auxiliary circuit including a condenser adapted to charge to a predetermined charge level substantially immediately after the operation of said device and to discharge through said energizing winding to ensure continued energization thereof until closure of said pairs of contacts.

5. In an aircraft, apparatus for automatically initiating the operation of safety equipment such as fire-preventing or extinguishing equipment for the aircraft in the event of crash or impact, comprising an impact detecting device having contact means and mounted substantially adjacent to the surface skin of a predetermined vulnerable portion of the aircraft likely to be damaged or severed during flight by contact with obstructions external to the aircraft, voltage supply means, an electrical circuit for operatively connecting said safety equipment to said supply means to initiate the operation of said equipment upon closure of said contact means when crash or impact occurs, said circuit comprising first and second relays disposed within the aircraft at a location remote from said vulnerable portion, said first relay having energizing winding means electrically connected in series with said detecting device to said supply means when said contact means are closed, said first relay having a pair of normally open contacts adapted to be closed when said first relay is energized for a predetermined period of time, said pair of contacts being connected in series with the energizing winding of said second relay to said supply means and adapted, when closed, to complete a circuit from said supply means to said last-mentioned energizing winding, said second relay having a pair of normally open contacts connected in series with the connections from said supply means to said safety equipment and adapted to be closed to initiate the operation of said equipment when said second relay is energized, a normally open holding circuit no part of which passes through said vulnerable portion of the aircraft for maintaining a closed electrical path from said supply means to the energizing winding means of said first relay when said holding circuit is closed, said holding circuit including said pair of contacts of said first relay adapted, when closed, to complete said holding circuit, and an auxiliary circuit no part of which passes through said vulnerable portion, said auxiliary circuit being connected in parallel with the energizing winding means of said first relay and adapted to ensure energization of said first relay for said predetermined period of time after operation of said detecting device to permit closure of the pair of contacts of said first relay regardless of whether said device or its electrical connections becomes severed or disabled after operation of said device, said auxiliary circuit including a condenser adapted to charge to a predetermined charge level substantially immediately after the operation of said device and to discharge through the energizing winding means of said first relay to ensure continued energization of said first relay until closure of its pair of contacts.

6. The combination according to claim 5 wherein the energizing winding means of said first relay comprises a first and a second winding, said first winding being connected in series with said detecting device to said supply means, said second winding being connected to said supply means in series with the pair of contacts of said first relay to form said holding circuit.

7. The combination according to claim 2 wherein said detecting device comprises a resilient insulating support member mounted on said vulnerable portion of the aircraft skin, and an electric contact element embedded in said support member and adapted to move into circuit-closing position to energize said relay means when the skin of said vulnerable portion is deformed upon crash or impact.

8. The combination according to claim 2 wherein said detecting device comprises an elongated hollow resilient casing disposed adjacent the skin of said vulnerable portion, two elongated contact elements mounted in said casing and normally separated from each other by resilient insulation material, said casing and material being adapted to bring said elements into contact with each other upon crash or impact with said vulnerable portion.

9. The combination according to claim 2 wherein said detecting device comprises a pair of normally open contacts connected in series with said energizing winding and adapted to close the circuit from said supply means to said energizing winding when the contacts of said device are closed upon crash or impact, a relatively low-current fuse and resistance connected in series with the contacts of said device between said supply means and said device, said resistance having a relatively low value selected to retard the blowing of said fuse long enough after said device becomes short-circuited to ground to ensure the charging of said condenser.

10. A crash or impact detecting switch for electrically energizing safety equipment within an aircraft which has an elongated external surface portion of predetermined curvature exposed during motion of the aircraft to contact with obstructions external to the aircraft, said switch comprising an elongated totally flexible resilient housing adapted to be mounted along said external surface portion to conform closely with the curvature thereof throughout the length of the housing, said housing having a hollow portion extending throughout substantially the entire length thereof, and a plurality of elongated electrical contact elements mounted in said hollow portion normally in spaced mutually-insulated relation and adapted upon crash or impact to make electrical contact with each other in response to the pressure exerted against said resilient housing and one of said elements.

11. A crash or impact detecting switch for electrically energizing safety equipment within an aircraft which has a predetermined vulnerable external surface portion likely to be damaged by contact with obstructions external to the aircraft, said switch comprising a hollow totally flexible and resilient casing adapted to be mounted on said external surface portion to conform closely with the contour thereof throughout the length of the casing, a plurality of electrical contact elements disposed in the hollow portion of said casing and extending along substantially the entire length thereof, and resilient insulation means sandwiched between contact elements across a major portion of the opposed surface areas thereof at predetermined locations distributed along the length of the elements normally to separate electrically said elements and deformable upon crash or impact to permit said elements to make electrical contact with each other.

12. An aircraft crash or impact detecting switch according to claim 11 wherein said casing comprises a rubber tube split longitudinally to permit insertion of said contact elements, and integral side flanges for mounting the casing on said surface.

13. An aircraft crash or impact detecting switch according to claim 11 wherein said contact elements comprise conductor strips having opposed edge portions over-hanging said insulation means, said edge portions being spaced relatively close together so as to make electrical contact upon crash or impact.

14. An aircraft crash or impact detector switch according to claim 13 wherein said insulation means comprises at least one resilient insulation strip having integral therewith spaced projections the outer ends of which are in continuous engagement with one of said conductor strips.

ANDERS MATHISEN.

References Cited in the file of this patent

UNITED STATES PATENTS

| Number | Name | Date |
|---|---|---|
| 1,725,963 | Morris | Aug. 27, 1929 |
| 2,100,416 | Torbert | Nov. 30, 1937 |
| 2,138,549 | La Bell | Nov. 29, 1938 |
| 2,530,749 | Yardeny | Nov. 21, 1950 |
| 2,573,335 | Hodgins | Oct. 30, 1951 |

OTHER REFERENCES

Abstract of Application Ser. No. 614,768 of Benish, published July 12, 1949, in 624 O. G. 637.